United States Patent [19]

Nishimatsu et al.

[11] Patent Number: 4,639,389
[45] Date of Patent: Jan. 27, 1987

[54] MAGNETIC RECORDING MEDIUM

[75] Inventors: Masaharu Nishimatsu, Komoro; Toshiaki Ide; Hiroyuki Arioka, both of Saku, all of Japan

[73] Assignee: TDK Corporation, Tokyo, Japan

[21] Appl. No.: 680,889

[22] Filed: Dec. 12, 1984

[30] Foreign Application Priority Data

Dec. 12, 1983 [JP] Japan ................. 58-232777
Dec. 12, 1983 [JP] Japan ................. 58-232778

[51] Int. Cl.$^4$ .............................. G11B 5/72
[52] U.S. Cl. ........................ 428/141; 360/134; 360/135; 360/136; 427/44; 427/128; 427/131; 428/143; 428/147; 428/425.9; 428/323; 428/522; 428/523; 428/694; 428/900
[58] Field of Search ............... 428/694, 323, 900, 522, 428/523, 143, 141, 425.9, 147; 427/44, 131, 132, 128; 360/134-136

[56] References Cited

U.S. PATENT DOCUMENTS

| | | | |
|---|---|---|---|
| 4,310,599 | 1/1982 | Akashi | 428/900 |
| 4,337,288 | 6/1982 | Takenaka | 428/900 |
| 4,414,270 | 11/1983 | Miyoshi | 428/336 |
| 4,419,406 | 12/1983 | Isobe | 427/128 |
| 4,439,486 | 3/1984 | Yamada | 428/694 |
| 4,443,514 | 4/1984 | Yamamoto | 427/131 |
| 4,451,531 | 5/1984 | Isobe | 428/900 |
| 4,465,737 | 8/1984 | Miyatuka | 428/695 |
| 4,474,843 | 10/1984 | Miyoshi | 428/695 |
| 4,486,500 | 12/1984 | Naruo | 428/694 |
| 4,567,083 | 1/1986 | Arioka | 428/694 |

Primary Examiner—Ellis P. Robinson
Attorney, Agent, or Firm—Oblon, Fisher, Spivak, McClelland, & Maier

[57] ABSTRACT

A magnetic recording medium comprising a plastic base film, a magnetic layer formed on one side of the base film and a backing layer formed on the other side of the base film, characterized in that said magnetic layer has a surface roughness of at most 0.08 μm, and said backing layer is composed essentially of first particles of an inorganic pigment having an average particle size of from 0.04 to 0.5 μm and a Mohs hardness of from 2 to 4 and second particles of an inorganic pigment having an average particles size of from 0.04 to 0.5 μm and a Mohs hardness of from 5 to 7, dispersed in a thermoset or radiation-cured binder.

10 Claims, 1 Drawing Figure

MAGNETIC RECORDING MEDIUM

BACKGROUND OF THE INVENTION

1. Field of the Invention

The present invention relates to a magnetic recording medium, and more particularly to a high density recording medium having excellent physical and electromagnetic conversion characteristics.

2. Description of the Prior Art

As ferromagnetic powders which have been employed for magnetic recording media, there are, for instance, $\gamma$-$Fe_2O_3$, Co-containing $\gamma$-$Fe_2O_3$, $Fe_3O_4$, Co-containing $Fe_3O_4$ and $CrO_2$. However, the magnetic characteristics of these ferromagnetic powders, such as the coercive force and the maximum residual magnetic flux density, are inadequate for high density recording with high sensitivity, and they are not suitable for magnetic recording of a signal having a short recording wavelength of at most about 1 $\mu$m or for magnetic recording with a narrow track width.

As the requirements for such magnetic recording media have become to be severe, ferromagnetic powders having characteristics suitable for high density recording have been developed or proposed. As such magnetic powders, there may be mentioned metals or alloys such as Fe, Co, Fe-Co, Fe-Co-Ni and Co-Ni, or alloys of these materials with Al, Cr or Si. A magnetic recording layer employing such an alloy powder is required to have a high coercive force and a high residual magnetic flux density for the purpose of the high density recording, and it is required to select a process for the preparation or an alloy composition so that the above-mentioned magnetic powder meets these requirements.

The present inventors have prepared magnetic recording media by employing various alloy powders, and have found that a magnetic recording medium with a noise level being sufficiently low and suitable for high density short wave recording is obtainable when the specific surface area as measured by BET method is at least 48 $m^2/g$, the coercive force of the magnetic layer is at least 1000 Oe, and the surface roughness of the magnetic layer is at most 0.08 $\mu$m as a $R_{20}$ value (an average value of 20 values as measured by Talystep method of Taylor-Hobson Co. by means of a needle of 0.1×2.5 $\mu$m under a needle pressure of 2 mg and with a cut off of 0.17 mm).

On the other hand, magnetic recording media having a thin ferromagnetic metal layer formed on a plastic base film have recently been used for the same purpose of high density recording.

A thin ferromagnetic metal layer formed by electroplating, chemical plating, vacuum vapor-deposition, sputtering or ion plating, is composed of 100% metal or alloy, and thus is capable of having a high recording density. However, when a thin ferromagnetic metal layer is formed by such a method, the surface condition of the substrate gives a substantial effect on the surface condition of the thin ferromagnetic layer, and thus affects the electromagnetic conversion characteristics, although the surface roughness can be thereby minimized to a level of 0.01 $\mu$m.

Besides, in either one of these magnetic recording media, there is a trend that the thickness of the substrate such as a plastic base film made of e.g. polyethylene terephthalate, polyethylene naphthalate, polyimide or polyamide, becomes thinner. At present, a thickness of 11 $\mu$m or less is being studied. As the base film becomes thinner, the medium tends to be so flexible that the friction will increase, and the tape running tends to be difficult. Therefore, it has been desired to improve the stiffness of the base film and thereby to regain the good running property. As a method for improving the running property, it has been proposed to provide a top coating on the magnetic surface. In such a case, however, there has been a problem such that the lubricating agent on the top coating is not durable, or gives rise to stickiness during storage under a high temperature condition. Further, when a top coating is provided, the surface roughness of the magnetic layer is minimum, whereby adhesion due to the tightening of the tape winding is likely to result, such being undesirable.

It has been common to provide a backing layer instead of the top coating, to ensure smooth running, proper winding and adequate tape strength. However, the properties of the conventional magnetic tapes provided with a backing layer are not necessarily satisfactory, and the following problems have been pointed out.

(a) A decrease of the S/N ratio as a result of providing the backing layer.

(b) Occurrence of a cinching phenomenon due to an inclusion of air.

(c) Abrasion of the backing layer.

(d) A magnetic tape for a long hour operation being susceptible to a damage during the loading or unloading operation.

(e) Defective winding of a magnetic tape.

SUMMARY OF THE INVENTION

It is an object of the present invention to solve the above-mentioned conventional technical problems and to provide a magnetic recording medium with a backing layer, which has a high S/N ratio, and is capable of preventing the cinching phenomenon, the abrasion of the backing layer and the damage to the tape during the loading or unloading opeation, and yet free from the dislocation or irregular winding of the tape during a high speed winding operation.

In order to accomplish the above object, the present invention provides a magnetic recording medium comprising a plastic base film, a magnetic layer formed on one side of the base film and a backing layer formed on the other side of the base film, characterized in that said magnetic layer has a surface roughness of at most 0.08 $\mu$m, and said backing layer is composed essentially of first particles of an inorganic pigment having an average particle size of from 0.04 to 0.5 $\mu$m and a Mohs hardness of from 2 to 4 and second particles of an inorganic pigment having an average particles size of from 0.04 to 0.5 $\mu$m and a Mohs hardness of from 5 to 7, dispersed in a thermoset or radiation-cured binder.

DETAILED DESCRIPTION OF THE INVENTION

Figure 1:
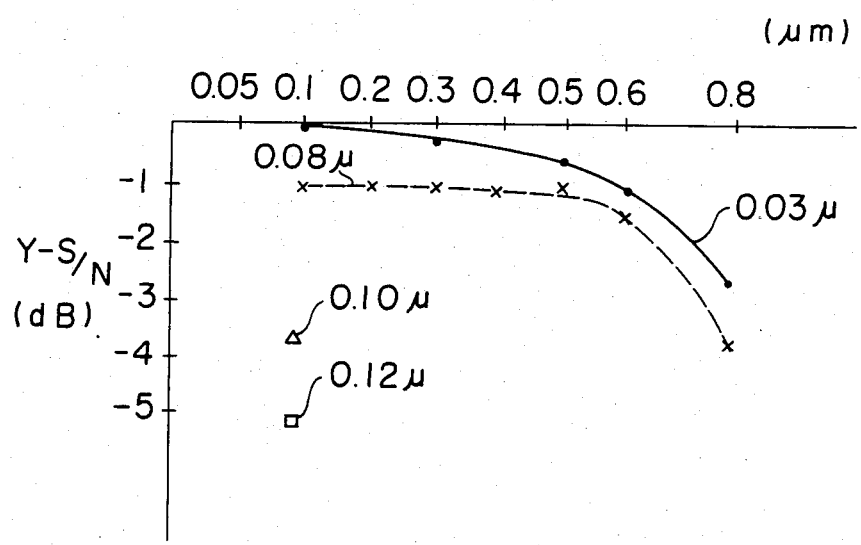
FIG. 1 is a graph illustrating the relationship between the S/N ratio and the surface roughness of the magnetic and backing layers of the magnetic recording medium.

When the magnetic layer is composed of metal or alloy powder dispersed in a resin binder, the magnetic powder preferably has a specific surface area of at least 48 $m^2/g$ as measured by BET method, whereby the S/N ratio of the magnetic recording medium can be improved. However, if the specific surface area is too large, the dispersibility of the magnetic powder in the binder resin tends to be inferior, and the effectiveness will be saturated. The surface roughness of the magnetic layer of this type is at most 0.08 82 m, whereby the recording sensitivity for a short wave can be increased.

In the case of a magnetic layer made of a thin metal or alloy layer, the surface roughness of at most 0.08 μm can readily be attained, and it is possible to reduce the surface roughness to a level of 0.01 μm.

In the case where Co-containing $\gamma$-$Fe_2O_3$ or Co-containing $Fe_3O_4$ powder is dispersed in a resin binder, it is preferred that the specific surface area of the powder is 18 $m^2/g$ as measured by BET method, the coercive force of the magnetic layer is at least 350 Oe and the surface roughness of the magnetic layer is at most 0.08 μm.

Heretofore, various inorganic pigments have been proposed as fillers for the backing layer. However, it has been very difficult to properly select the type, the hardness, the particle size or the shape of the inorganic pigment as the filler, and there have been problems such that the desirable effect of the backing layer tends to be impaired, or in a worse case, an adverse effect is likely to be brought about. For instance, in the case of $CaCO_3$ having an average particle size of 0.04 μm or less, which is well known as a filler for a backing layer, it becomes difficult to disperse it in a binder unless the particle size is properly selected. If a backing layer is formed while the dispersion is inadequate, irregularities will be formed in the backing layer, and when the magnetic tape is wound up, such irregularities are likely to be transferred to the magnetic recording layer, whereby the S/N ratio will deteriorate. Besides, $CaCO_3$ particles are soft whereby the durability for repeated running is poor, and the backing layer is susceptible to abrasion and white powder will be formed. The formation of a substantial amount of such white powder is likely to lead to a trouble of video tape recorders.

Further, when an inorganic pigment having a relatively large average particle size is used as a filler for the backing layer, the irregularities on the surface of the backing layer become coarse, and when the magnetic tape is wound up, the irregularities of the backing layer will be transferred to the magnetic recoridng layer, whereby the S/N ratio will be lowered, such being undesirable.

The present inventors have conducted extensive researches on inorganic pigments to be used as fillers for a backing layer, and have found that a mixture of particles of an inorganic pigment having an average particle size of from 0.02 to 0.5 μm and a Mohs hardness of from 2 to 4 and particles of an inorganic pigment having an average particle size of from 0.04 to 0.5 μm and a Mohs hardness of from 5 to 7, dispersed in a binder, is suitable as the filler for the backing layer.

As the inorganic pigment having an average particle size of from 0.02 to 0.5 μm and a Mohs hardness of from 2 to 4, it is preferred to use $CaCO_3$, $ZnO$ or $MgCO_3$. As the inorganic pigment having an average particle size of from 0.04 to 0.5 μm and a Mohs hardness of from 5 to 7, it is preferred to employ $TiO_2$, $\alpha$-$Fe_2O_3$, $Fe_3O_4$, $MgO$, $SiO_2$, $SnO_2$ or $ZrO_2$.

According to the present invention, these inorganic pigment particles having different Mohs hardness are mixed in a weight ratio of e.g. from 1:9 to 5:5, and the mixture is dispersed in and kneaded with a binder in a weight ratio to the binder of from 4:1 to 1:1. The coating composition thereby obtained is coated on the rear side of a base film to form a backing layer having a thickness of from 0.3 to 1.5 μm and a surface roughness of from 0.05 to 0.6 μm. The magnetic tape thus provided with the backing layer was able to solve all of the above-mentioned conventional difficulties.

Namely, according to the present invention, the average particle size of the inorganic fillers is selected within a proper range of from 0.04 to 0.5 μm, whereby the dispersibility can be improved and a backing layer having a proper surface roughness is obtainable. Thus, the S/N ratio will be improved, while at the same time, the cinching phenomenon will be prevented.

Further, hard particles of an inorganic pigment having a Mohs hardness of from 5 to 7 are mixed with soft particles of an inorganic pigment having a Mohs hardness of from 2 to 4, whereby the hardness of the backing layer is properly controlled. Thus, a backing layer having a proper flexibility and excellent reinforcing effect is obtainable. Accordingly, the dislocation or irregular winding of the magnetic tape during a high speed winding operation, will be minimized, and the damage to the magnetic tape during the loading or unloading operation will be prevented. Furthermore, the abrasion of the backing layer due to the contact with the guide pins or poles of VTR or a video cassette, will be minimized, and the formation of white powder will be prevented.

Various thermosetting or radiation curable resin binders which are commonly used in the conventional magnetic recording media may be employed as the binder for the backing layer.

As a thermosetting resin binder, a binder comprising nitrocellulose, a polyurethane prepolymer, a vinyl chloride-vinyl acetate copolymer (inclusive of the one wherein a carboxylic acid such as maleic acid has been introduced), a vinyl chloride-vinyl acetate-vinyl alcohol copolymer (inclusive of the one wherein a carboxylic acid such as maleic acid has been introduced), a vinyl chloride-vinyl alcohol copolymer (inclusive of the one wherein a carboxylic acid such as maleic acid has been introduced) and polyisocyanate, or a binder comprising a polyurethane prepolymer, a vinyl chloride-vinyl acetate copolymer (inclusive of the one wherein a carboxylic acid such as maleic acid has been introduced) and a polyisocyanate, is particularly suitable for dispersing the above-mentioned pigments.

As the radiation curable resin, it is particularly advantageous to employ a radiation curable resin containing acrylic double bonds, maleic double bonds or allyl-type double bonds which are cross-linkable in response to radiation.

By using a radiation curable resin for the backing layer, it is possible to form a backing layer which is more uniform and tougher than the backing layer made of a thermosetting resin, and yet no transfer of the roughness of the backing layer surface onto the magnetic layer surface will take place, which is otherwise likely to take place during the thermosetting operation. Thus, the use of the radiation curable resin is advantageous.

Further, in the case where both the magnetic layer and the backing layer are cured by radiation, it is possible to conduct the curing continuously, and it is possible to prevent the dropouts since there is no transfer of the roughness of the backing layer surface to the magnetic layer surface. Furthermore, the radiation curing contributes to the energy conservation and the reduction of the manpower for the process, thus leading to a reduction of the costs. In addition to the reduction of the dropouts by preventing the tightening of the tape winding at the time of the thermosetting, the variation in the output in the longitudinal direction of the magnetic tape can be minimized, which is otherwise likely to be caused due to the difference in the pressure at different portions in the diametric direction of the rolled tape. The variation in the output in the longitudinal direction of the magnetic tape, is attributable to the fact that the base film thickness has become as thin as 11 μm or less, and the hardness of the metal magnetic powder is smaller than the magnetic oxide such as γ-Fe$_2$O$_3$, whereby the surface of the magnetic layer has small hardness and is susceptible to the influence of the tightening of the tape winding. Such an influence can be overcome by the radiation cured backing layer, whereby the variation in the output or the variation in the dropouts in the diametric direction of the rolled tape can be minimized.

The ratio of the filler to the binder is preferably within a range of from 4:1 to 1:1. If the ratio of the filler to the binder is less than 1:1, the backing layer tends to adhere to the magnetic layer, such being undesirable. On the other hand, if the ratio of the filler to the binder exceeds 4:1, the running friction tends to increase, such being undesirable.

The thinner the backing layer, the better. However, if the backing layer is too thin, no adequate reinforcing effectiveness will be obtained. Therefore, the thickness is preferably within a range of from 0.3 to 1.5 μm.

The surface roughness Rz of the backing layer is preferably within a range of from 0.05 to 0.6 μm. If the surface roughness is greater than 0.6 μm, the surface irregularities of the backing layer are likely to be transferred to the magnetic recording layer, whereby the S/N ratio will be lowered. On the other hand, if the surface roughness is less than 0.05 μm, the friction tends to increase, whereby the running property will be impaired.

Further, in order to reduce the friction of the backing layer and to improve the running property, it is possible to use a lubricating agent which has been commonly used for the backing layer of this type, such as a silicone oil, a fluorine oil, a fatty acid, a fatty acid ester, a paraffin, a liquid paraffin or a surfactant. It is particularly preferred to employ a fatty acid and/or a fatty acid ester. As such a fatty acid, there may be employed a fatty acid having at least 12 carbon atoms (RCOOH where R is an alkyl group having at least 11 carbon atoms) such as caprylic acid, lauric acid, myristic acid, palmitic acid, stearic acid, behenic acid, oleic acid, elaidic acid, linolic acid, linolenic acid or stearolic acid. As the fatty acid ester, there may be employed a fatty acid ester composed of a monobasic fatty acid having from 12 to 16 carbon atoms and a monohydric alcohol having from 3 to 12 carbon atoms, or a fatty acid ester composed of a monobasic fatty acid having at least 17 carbon atoms and a monohydric alcohol having carbon atoms which add up to a total of from 21 to 13 carbon atoms with the carbon number of the fatty acid.

Magnetic Layer 1

As a magnetic alloy satisfying the above characteristics, there may be employed a fine powder of Co, Fe-Co, Fe-Co-Ni or Co-Ni, or such a fine powder mixed with Cr, Al or Si. It may be a fine powder obtained by wet-reducing a metal salt with a reducing agent such as BH$_4$, a fine powder obtained by coating the surface of iron oxide with a Si compound and dry-reducing the product in H$_2$ gas, or a fine powder obtained by evaporating an alloy in a low pressure argon atmosphere, and it has an axial ratio of from 1:5 to 1:10 and a residual magnetic flux density Br of from 2000 to 3000 gauss, and satisfies the above-mentioned conditions for the coercive force and the surface area.

Various binders may be employed in combination with the alloy magnetic powder to prepare magnetic coating compositions. It is usually preferred to employ a thermosetting resin binder or a radiation curable resin binder. As other additives, there may be employed a dispersant, a lubricant or an antistatic agent in accordance with the conventional method. In a case where there is a problem in the dispersibility because of the employment of the magnetic powder having a BET specific surface area of 48 m$^2$/g, a surfactant or an organic titanium coupling agent may be employed as the dispersant. As the binder, there may be employed a binder comprising a vinyl chloride-vinyl acetate-vinyl alcohol copolymer, a vinyl chloride-vinyl acetate copolymer, a vinyl chloride-vinyl alcohol copolymer (each may contain a carboxylic acid such as maleic acid) a polyurethane prepolymer and a polyisocyanate, such a binder which further contains nitrocellulose, other known thermosetting binders, or a radiation curable resin binder containing resin groups such as acrylic double bonds or maleic double bonds sensitive to ionized energy.

In accordance with a usual method, the alloy magnetic powder is mixed with the binder and a predetermined solvent and various additives to prepare a magnetic coating material. The coating material is coated on a substrate such as a polyester base film and then subjected to thermosetting or radiation curing to form a magnetic layer, which is then subjected to calendering. Then, a backing layer is formed in a similar manner, and the product is subjected to calendering to obtain a recording medium having a predetermined surface roughness.

In the case where the magnetic layer is a thin metal or alloy layer, the ferromagnetic material may be the same material as the above-mentioned powder material, and may be prepared by the above-mentioned method.

The Binder for the Backing Layer

The radiation curable or sensitive resin to be used in the present invention, is usually a resin containing at least two unsaturated double bonds in its molecular chain, which are capable of generating radicals for crosslinking when irradiated. Such a resin may also be obtained by subjecting a thermoplastic resin to radiation sensitive modification. It should be mentioned that when a radiation sensitive (curable) resin is used as a binder for the magnetic layer, such a resin may be the same or different from the resin used for the backing layer.

The radiation sensitive modification can be conducted, for instance, by introducing into the molecule a radiation cross-linkable or polymerizable group having a radical polymerizable unsaturated double bond such as an acrylic double bond attributable to e.g. acrylic acid, methacrylic acid or their ester compounds, an allyl-type double bond attributable to e.g. diallyl phthalate, or an unsaturated bond attributable to e.g. maleic acid or maleic acid derivatives. Any other radiation cross-linkable or polymerizable unsaturated double bond may likewise be employed.

Examples of the thermoplastic resins which can be modified into the radiation-sensitive resins will be given below.

(I) Vinyl Chloride Type Copolymers

There may be mentioned a vinyl chloride-vinyl acetate-vinyl alcohol copolymer (which may contain a carboxylic acid such as maleic acid), a vinyl chloride-vinyl alcohol copolymer (which may contain a carboxylic acid such as maleic acid), a vinyl chloride-vinyl acetate coplymer (which may contain a carboxylic acid such as maleic acid), a vinyl chloride-vinyl alcohol-vinyl propionate copolymer, a vinyl chloride-vinyl acetate-maleic acid copolymer, a vinyl chloride-vinyl acetate-OH-terminated side chain alkyl group copolymer, such as VROH, VYSM, VYNC or VYEGX, manufactured by UCC (Union Carbide Corporation, U.S.A.), and a maleic acid modified VERR also manufactured by UCC.

These copolymers can be modified to radiation-sensitive resins by introducing into them acrylic double bonds, maleic double bonds or allyl-type double bonds by the process described later.

(II) Saturated Polyester Resins

There may be mentioned saturated polyester resins obtained by the esterification of saturated polybasic acids such as phthalic acid, isophthalic acid, terephthalic acid, maleic acid, maleic acid derivatives, succinic acid, adipic acid or sebacic acid, with polyhydric alcohols such as ethylene glycol, diethylene glycol, glycerol, trimethylol propane, 1,2-propylene glycol, 1,3-butanediol, dipropylene glycol, 1,4-butanediol, 1,6-hexanediol, pentaerythritol, sorbitol, glycerin, neopentyl glycol or 1,4-cyclohexane dimethanol, and resins obtained by the modification of these polyester resins with e.g. $SO_3Na$ (e.g. Vylon 53S).

These resins can be modified to radiation-sensitive resins by the process mentioned hereinafter.

(III) Unsaturated Polyester Resins

There may be mentioned polyester compounds containing radiation-curable unsaturated double bonds in the molecular chains, such as unsaturated polyester resins, prepolymers, and oligomers containing radiation curable unsaturated double bonds, which correspond to the saturated polyester resins prepared by the esterification of polybasic acids with polyhydric alcohols as referred to as the thermoplastic resins in the above (II) with the exception that a part of the polybasic acid has been replaced by maleic acid.

Examples of the polybasic acids and polyhydric alcohols for the saturated polyester resins include those compounds as enumerated in the above (I), and examples of the radiation-curable unsaturated double bonds include maleic acid, fumaric acid, and so forth.

The radiation-curable unsaturated polyester resin can be produced by adding maleic acid, fumaric acid, or the like to at least one polybasic acid component and at least one polyhydric alcohol component, and then subjecting the mixture to a dehydration or dealcoholization reaction in the conventional manner, i.e. at a temperature of from 180° to 200° C. in a nitrogen atmosphere in the presence of a catalyst, thereafter raising the temperature to a range of from 240° to 280° C. whereupon a condensation reaction is effected under a reduced pressure of from 0.5 to 1 mmHg, to obtain a polyester resin. The content of maleic acid, fumaric acid, or the like may be in a range of from 1 to 40 mol %, or preferably from 10 to 30 mol %, in the acid component in view of the degree of cross-linking at the time of its production, the radiation-curability, and so on.

(IV) Polyvinyl Alcohol Type Resins

There may be mentioned polyvinyl alcohol, butyral resins, acetal resins, formal resins, and copolymers of these components.

The hydroxyl groups contained in these resins can be modified to be radiation-sensitive by the process described hereinafter.

(V) Epoxy Type Resins and Phenoxy Resins

There may be mentioned epoxy resins obtained by the reaction of bisphenol A with epichlorohydrin, methylepichlorohydrin or the like, such as EPIKOTE 152, 154, 828, 1001, 1004 and 1007 (manufactured by Shell Chemical Company); DEN431, DER732, DER511 and DER331 (manufactured by Dow Chemical Company); EPICLON-400 and EPICLON-800 (manufactured by Dai-Nippon Ink K.K.); phenoxy resins such as PKHA, PKHC and PKHH which are the highly polymerized resins among the above-mentioned epoxy resins, and are manufactured by Union Carbide Corporation; and copolymers of brominated bisphenol A with epichlorohydrin, such as EPICLON 145, 152, 153 and 1120 (manufactured by Dai-Nippon Ink & Chemicals Co.) and others.

The radiation-sensitive modification is effected by utilization of the epoxy groups contained in these resins.

(VI) Cellulose Derivatives

Cellulose derivatives of various molecular weights are also effective as thermoplastic components. Particularly effective and preferable among these cellulose derivatives are nitrocellulose, cellulose aceto-butylate, ethyl-cellulose, butyl-cellulose, acetyl-cellulose, and so forth.

These cellulose derivatives are modified to radiation-sensitive resins by activating the hydroxyl groups in the resins by the process mentioned hereinafter.

Besides the above, the resins which may also be used effectively for the radiation-sensitive modification are polyfunctional polyester resins, polyether ester resins, polyvinyl pyrrolidone resins and derivatives thereof (e.g., PVP olefin copolymers), polyamide resins, polyimide resins, phenol resins, spiro-acetal resins, acrylic resins containing therein at least one acrylic or methacrylic acid ester having a hydroxyl group as the polymerization component, and the like.

Further, by blending a thermoplastic elastomer or prepolymer with the above-described radiation-sensitive, modified thermoplastic resin, it is possible to make the coating film much more tenacious. Furthermore, when such an elastomer or prepolymer is likewise modified to be radiation-sensitive, a better result can be obtained, as will be described hereinbelow.

In the following, there will be given examples of the elastomers and prepolymers which may be combined with the above-described radiation-sensitive resins.

(I) Polyurethane Elastomers, Prepolymers and Telomers

The use of polyurethane elastomers is particularly effective in that their abrasion resistance and adhesion to EPT films are satisfactory.

Examples of such effective urethane compounds are: polyurethane elastomers, prepolymers, and telomers which are composed of polycondensates of various polyhydric isocyanates, as the isocyanate components, such as 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodule L, Desmodule N, and so on; and various polyesters such as linear saturated polyesters (e.g. those obtained by polycondensation of polyhydric alcohols such as ethylene glycol, diethylene glycol, glycerin, trimethylolpropane, 1,4-butanediol, 1,6-hexanediol, pentaerythritol, sorbitol, neopentyl glycol, 1,4-cyclohexane dimethanol, and so forth with saturated polybasic acids such as phthalic acid, isophthalic acid, terephthalic acid, maleic acid, succinic acid, adipic acid, sebasic acid, and so forth), linear saturated polyethers (e.g. polyethylene glycol, polypropylene glycol, polytetraethylene glycol, and so forth) as well as caprolactum, hydroxyl-containing acrylic acid esters, hydroxyl-containing methacrylic acid esters, and so forth.

While these elastomers may be combined, as they are, with various radiation-sensitive thermoplastic resins, it will be highly effective to further react these elastomers with a monomer having an acrylic double bond, an allyl-type double bond, or the like which reacts with the terminal isocyanate group or hydroxyl group in the urethane elastomer, to thereby modify the resins to be radiation-sensitive.

(II) Elastomers of Acrylonitrile-Butadiene Copolymers

Prepolymers of acrylonitrile-butadiene copolymers containing therein terminal hydroxyl groups, such as "poly BD Liquid Resin" produced by Sinclair Petrochemicals Corp. and available in general market, or elastomers such as "Hycar 1432J" manufactured by Japanese Zeon K.K., and so forth are particularly suitable as the elastomeric components, with which the double bonds in butadiene produce radicals by the radiation rays to cause cross-linking and polymerization.

(III) Polybutadiene Elastomers

Low molecular weight prepolymers having the terminal hydroxyl groups, such as "Poly BD liquid Resin R-15", manufactured by Sinclair Petrochemicals Corp., are particularly suitable in respect of their compatibility with thermoplastic resins. In the "R-15" prepolymer, since the terminal end of the molecule is occupied by the hydroxyl group, it is possible to enhance the radiation sensitivity by adding an acrylic unsaturated double bond to the terminal end of the molecule, whereby the prepolymer becomes much more advantageous as the binder.

Further, cyclized products of polybutadiene such as "CBR-M901" manufactured by Japan Synthetic Rubber Co., also exhibit excellent performance by their combination with the thermoplastic resins. In particular, cyclized polybutadienes are highly efficient in their cross-linking and polymerization by radiation because of the radicals of the unsaturated bonds inherent to polybutadiene. Thus, they have excellent properties as the binder.

Further, suitable among other thermoplastic elastomers and their prepolymers are: styrene-butadiene rubbers, chlorinated rubbers, acrylic rubbers, isoprene rubbers and their cyclized products (e.g. "CIR701", manufactured by Japan Synthetic Rubber K.K.), and elastomers such as epoxy-modified rubbers, or internally plasticized saturated linear polyesters (e.g. "Vylon #300", a product of Toyo Spinning K.K.). These may also be used effectively by subjecting them to the modifying treatment for the radiation-sensitization described hereinbelow.

Now, examples for the syntheses of the radiation-sensitive binders will be given.

PRODUCTION OF TOLYLENE DIISOCYANATE ADDUCT (a) Synthesis of an Acryl-Modified Product of a Vinyl Chloride-Vinyl Acetate Copolymer Type Resin (Radiation-Sensitive Modified Resin)

750 Parts by weight of Vinylite VAGH, 1250 parts by weight of toluene, and 500 parts by weight of cyclohexanone were charged into a four-necked flask of a 5-liter capacity and dissolved under heating. After raising the temperature to 80° C., 61.4 parts by weight of 2-hydroxyethyl methacrylate adduct of tolylene diisocyanate was added. Further, 0.012 part by weight of tin octylate and 0.012 part by weight of hydroquinone were added, and the reaction was carried out at a temperature of 80° C. in a nitrogen (N₂) stream until the conversion of NCO reached 90%. After completion of the reaction, the reaction system was cooled and diluted by addition of 1250 parts by weight of methyl ethyl ketone.

PRODUCTION OF 2-HYDROXYETHYL METHACRYLATE (2HEMA) ADDUCT OF TOLYLENE DIISOCYANATE (TDI)

348 Parts by weight of tolylene diisocyanate was heated to a temperature of 80° C. in a four-necked flask of one-liter capacity in a nitrogen (N₂) stream. Thereafter, 260 parts by weight of 2-hexaethylene methacrylate, 0.07 part by weight of tin octylate, and 0.05 part by weight of hydroquinone were added dropwise into a reaction vessel, while cooling to control the temperature inside the reaction vessel to be in a range of from 80° to 85° C. After completion of the dropwise addition, the mixture was stirred for three hours at 80° C. to complete the reaction. After completion of the reaction, the reaction product was taken out of the reaction vessel and cooled to obtain 2-hydroxyethyl methacrylate (2HEMA) adduct of tolylene diisocyanate (TDI) as a white paste.

(b) Synthesis of an Acryl-Modified Product of a Butyral Resin (Radiation-Sensitive Modified Resin)

100 Parts by weight of a butyral resin, "BM-S" produced by Sekisui Chemical Co., was charged into a four-necked flask of a 5-liter capacity, together with 191.2 parts by weight of toluene and 71.4 parts by weight of cyclohexanone, and dissolved under heating. After raising the temperature to 80° C., 7.4 parts by weight of the 2-hydroxyethyl methacrylate adduct of tolylene diisocyanate was added to the solution, followed by further addition of 0.015 part by weight of tin octylate and 0.015 part by weight of hydroquinone. Then, the reaction was carried out at 80° C. in a nitrogen (N₂) stream until the conversion of NCO reached at least 90%. After completion of the reaction, the reaction product was cooled and diluted with methyl ethyl ketone.

(c) Synthesis of an Acryl-Modified Product of a Saturated Polyester Resin (Radiation-Sensitive Modified Resin)

100 Parts by weight of "Vylon RV-200" manufactured by Toyo Spinning Co., was dissolved under heating in 116 parts by weight of toluene and 116 parts by weight of methyl ethyl ketone. After raising the temperature to 80° C., 3.55 parts by weight of the 2HEMA adduct of TDI was added, followed by further addition of 0.007 part by weight of tin octylate and 0.007 part by weight of hydroquinone. Then, the reaction was carried out at 80° C. in a nitrogen ($N_2$) stream until the conversion of NCO reached at least 90%.

(d) Synthesis of an Acryl-Modified Product of an Epoxy Resin (Radiation-Sensitive Modified Resin)

400 Parts by weight of "Epikote 1007" manufactured by Shell Chemical Co., was dissolved under heating in 50 parts by weight of toluene and 50 parts by weight of methyl ethyl ketone. Thereafter, 0.006 part by weight of N,N-dimethylbenzylamine and 0.003 part by weight of hydroquinone were added to the solution, and the temperature was raised to 80° C. Then, 69 parts by weight of acrylic acid was added dropwise, and the reaction was carried out at 80° C. until the acid value became 5 or lower.

(e) Synthesis of an Acryl-Modified Product of a Urethane Elastomer (Radiation-Sensitive Elastomer)

250 Parts by weight of an isocyanate-terminated diphenylmethane diisocyanate (MDI) type urethane prepolymer, "Nippolan 4040", manufactured by Nippon Polyurethane Industry Co., 32.5 parts by weight of 2HEMA, 0.07 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the reaction vessel to be in a range of from 80° to 90° C. After completion of the dropwise addition, the reaction was conducted at 80° C. until the conversion of NCO reached at least 95%.

(f) Synthesis of an Acryl-Modified Product of a Polyether Type Terminal Urethane-Modified Elastomer (Radiation-Sensitive Elastomer)

250 Parts by weight of a polyether, "PTG-500" manufactured by Nippon Polyurethane Industry, 32.5 parts by weight of 2HEMA, 0.007 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the raction vessel to be in a range of from 80° to 90° C. After completion of the dropwise addition, the reaction was conducted at 80° C. until the conversion of NCO reached at least 95%.

(g) Synthesis of an Acryl-Modified Product of a Polybutadiene Elastomer (Radiation-Sensitive Elastomer)

250 Parts by weight of a low molecular weight hydroxyl-terminated polybutadiene, "Poly-BD-Liquid Resin R-15" manufactured by Sinclair Petrochemicals, Inc., 32.5 parts by weight of 2HEMA, 0.007 part by weight of hydroquinone, 0.009 part by weight of tin octylate were charged into a reaction vessel, and dissolved under heating at 80° C. Then, 43.5 parts by weight of TDI was added dropwise, while cooling to control the temperature inside of the reaction vessel to be in a range of from 80° to 90° C. After completion of the dropwise addition, the reaction was conducted at 80° C. until the conversion of NCO reached at least 95%.

Among high-polymer substances, there have been known those which undergo decomposition when irradiated with radiation rays and those which undergo cross-linking among the molecules by the irradiation with radiation rays. Those which undergo cross-linking among the molecules include polyethylene, polypropylene, polystyrene, polyacrylic acid ester, polyacrylamide, polyvinyl chloride, polyester, polyvinyl pyrrolidone rubbers, polyvinyl alcohol and polyacrolein. Such cross-linking type polymers can be used as radiation curable coating resins for the backing layer, as they are, i.e. without subjecting them to any particular modifying treatment as mentioned above, since they undergo a cross-linking reaction without such treatment.

Furthermore, according to this method, even a non-solvent type resin can effectively used for the back coating, since it can be cured in a short period of time without requiring any solvent.

Among these, particularly preferred is a radiation curable resin comprising a vinyl chloride-vinyl acetate-vinyl alcohol copolymer (which may contain a carboxylic acid) or an acryl-modified vinyl chloride-vinyl acetate-vinyl alcohol copolymer (which may contain a carboxylic acid) and a urethane acrylate. More preferred is a combination comprising (A) a plastic compound containing at least two radiation curable unsaturated double bonds and having a molecular weight of from 5,000 to 100,000, (B) a rubber-like compound containing no or at least one radiation curable unsaturated double bonds and having a molecular weight of from 3,000 to 100,000, and (C) a compound containing at least one radiation curable unsaturated double bonds and having a molecular weight of 200 to 3,000 in the respective proportions of from 20 to 70% by weight of (A), from 20 to 80% by weight of (B) and from 10 to 40% by weight of (C). It is advantageous to employ a radiation curable resin, since the curing time is thereby short, and no transfer of e.g. the filler from the surface of the backing layer to the magnetic layer takes places when the magnetic recording medium is wound up.

As the lubricating agent, those mentioned above may be employed.

As the active energy rays to be used for crosslinking of the backing layer of the present invention, there may be employed electron beams generated from a radiation accelerator as the source of radiation, $\gamma$-rays generated from $Co^{60}$ as the source of radiation, $\beta$-rays generated from $Sr^{90}$ as the source of radiation, or X-rays generated from an X-ray generator as the source of radiation.

From the viewpoints of the easy control of the absorption dose, the introduction to the production line, or the shielding of ionized radiation, it is particularly advantageous to use the radiation rays from the radiation accelerator as the source of radiation.

With respect to the characteristics of the radiation rays to be used for the curing of the backing layer, it is preferred, from the aspect of the penetrating power, to irradiate by means of the radiation accelerator having an acceleration voltage of from 100 to 750 KV, or preferably from 150 to 300 KV, at an absorption dose in a range of from 0.5 to 20 Mrad.

For the curing of the backing layer according to the present invention, a low dose type radiation accelerator (an electron-curtain system) manufactured by Energy Science Co., U.S.A. is extremely advantageous from the viewpoints of its easy introduction into the tape coating process line and the shielding of the secondary X-rays within the accelerator.

Needless to say, it is possible to use a Van de Graaff type accelerator which has so far been used widely as the radiation accelerating appratus.

Further, for the cross-linking by radiation, it is important to irradiate the backing layer with the radiation rays in an inert gas stream such as nitrogen ($N_2$) gas, helium (He) gas, and so forth. It is extremely disadvantageous to conduct the radiation in the air because $O_3$, etc. generated by the radiation for the cross-linking of the binder components serve to prevent the radicals generated in the polymer from acting advantageously for the cross-linking reaction.

It is therefore important to maintain the atmosphere at a portion where the active energy rays are irradiated to be an inert gas atmosphere such as $N_2$, He or $CO_2$, with the oxygen concentration being as low as 1% at the maximum.

Other useful binder components include acrylic acid, methacrylic acid, acrylamide and methacrylamide as monomers. Various polyesters, polyols or polyurethanes may be modified with a compound having an acrylic double bond to obtain binders containing double bonds. Binders having various molecular weights may be prepared by incorporating polyhydric alcohols and polybasic carboxylic acids, as the case requires. Specific examples of the radiation curable resins given above are only a part of useful radiation curable resins. They may be used in combination as a mixture.

Now, the present invention will be described in further detail with reference to Examples and Comparative Examples. However, it should be understood that the present invention is by no means restricted by these specific Examples.

Magnetic Layer 1

Various alloy powders were prepared by a wet-reducing method. These powders were composed of acicular particles having an axial ratio (i.e. short axis/long axis) of from 1/5 to 1/10, and having a residual magnetic flux density of from 2000 to 3000 gauss, a coercive force of from 1000 to 2000 Oe and a BET specific surface area of from 45 to 70 $m^2/g$. Each of these magnetic powders was mixed with other components in the following mixing ratio by a usual method.

| | Parts by weight |
|---|---|
| Fe—Co—Ni alloy powder | 100 |
| Vinyl chloride-vinyl acetate-vinyl alcohol copolymer (VAGH manufactured by U.C.C. Co., U.S.A) | 15 |
| Polyurethane prepolymer (Desmodule 22 manufactured by Bayer AG) | 10 |
| Methyl ethyl ketone/toluene (50/50) | 250 |
| Myristic acid | 2 |
| Sorbitol stearate | 2 |

To the mixture thus obtained, 30 parts by weight of a polyisocyanate (Desmodule L manufactured by Bayer AG) was added to obtain a magnetic coating material. The coating material was coated on a polyester film in a thickness of 3.5 μm, dried and subjected to calender treatment. Then, the thermosetting reaction was conducted at 80° C. for 48 hours.

By controlling the calender treatment, magnetic layers having various surface roughness within a range of from 0.02 to 0.12 μm were obtained.

Magnetic Layer 2

By using the same magnetic powder as used for the magnetic layer 1, a mixture having the following composition was prepared.

| | Parts by weight |
|---|---|
| Fe—Co—Ni alloy powder | 100 |
| Vinyl chloride-vinyl acetate-vinyl alcohol copolymer (VAGH) | 13 |
| Acrylic double bond-containing urethane (Nippolan 4040 manufactured by Nippon Polyurethane Co., with the terminals modified with MDI and HEMA) | 12 |

This mixture was coated on a polyester film in a thickness of 3.5 μm, dried and subjected to calender treatment, followed by electron beam curing.

By controlling the calender treatment, magnetic layers having various surface roughness within a range of from 0.02 to 0.12 μm were obtained.

Magnetic Layer 3

A magnetic layer was formed by a vacuum vapour deposition, in which an alloy magnetic layer comprising 80% by weight of cobalt and 20% by weight of nickel, was vapour deposited on the surface of a polyethylene terephthalate film in a thickness of about 1,500 Å by oblique vapour deposition. The surface roughness was 0.01 μm.

EXAMPLE 1

A backing layer was formed on the rear side of each of the above-mentioned- polyester base films having magnetic layers 1, 2 and 3, respectively, as follows.

Namely, each composition as identified in Table 1, was thoroughly kneaded and dispersed in a ball mill, and coated on the rear side of each of the above three types of base films in a thickness of 1.0 μm, and subjected to thermosetting and calender treatment, whereby five samples were prepared for each composition. In Table 1, the amounts of the respective components of each composition are shown by parts by weight relative to 100 parts by weight of the inorganic pigments. The average particle size of the inorganic pigment $CaCO_3$ in Sample 10, was 0.02 μm, and the average particle sizes of the inorganic pigments in Samples 1 to 4 were from 0.04 to 0.5 μm.

Thereafter, each magnetic recording medium thereby obtained was cut into a video tape having a width of ½ inch and set in a VHS video cassette, whereupon the electromagnetic conversion characteristics, the cinching phenomenon, the abrasion of the backing layer, the damage caused during the loading or unloading operation and the irregular winding were measured. The results of the measurements are shown in Table 2 (the Samples having the magnetic layer 1), Table 3 (the Samples having the magnetic layer 2) and Table 4 (the Samples having the magnetic layer 3). In Tables 1 to 4, Samples 1 to 8 represent Examples of the present invention, and Samples 9 and 10 represent Comparative Examples. In the samples in Tables 2 and 3, the magnetic layers had a surface roughness of 0.08 μm or less, and the backing layers had a surface roughness of 0.6 μm or less.

TABLE 1

| Sample No. | Inorganic pigments Mohs hardness 5-7 | Mohs hardness 2-4 | Mixing ratio | Urethane | Vinyl chloride-vinyl acetate copolymer | Isocyanate compound | Myristic acid | MEK | NC |
|---|---|---|---|---|---|---|---|---|---|
| 1 | $TiO_2$ | $CaCO_3$ | 8/2 | 20 | 20 | 10 | 2.5 | 800 | 0 |
| 2 | $\alpha\text{-}Fe_2O_3$ | $CaCO_3$ | 8/2 | 20 | 10 | 10 | 2.5 | 800 | 0 |
| 3 | $TiO_2$ | $CaCO_3$ | 8/2 | 20 | 10 | 10 | 2.5 | 800 | 0 |
| 4 | MgO | $CaCO_3$ | 8/2 | 20 | 10 | 10 | 2.5 | 800 | 0 |
| 5 | $Fe_3O_4$ | $CaCO_3$ | 8/2 | 20 | 10 | 10 | 2.5 | 800 | 0 |
| 6 | $SiO_2$ | $CaCO_3$ | 8/2 | 20 | 10 | 10 | 2.5 | 800 | 0 |
| 7 | $SnO_2$ | $CaCO_3$ | 8/2 | 20 | 10 | 10 | 2.5 | 800 | 0 |
| 8 | $ZrO_2$ | $CaCO_3$ | 8/2 | 20 | 10 | 10 | 2.5 | 800 | 0 |
| 9 | $TiO_2$ | — | — | 20 | 10 | 10 | 2.5 | 800 | 0 |
| 10 | — | $CaCO_3$ | — | 20 | 10 | 10 | 2.5 | 800 | 0 |

TABLE 2

| | Y-S/N (dB) | Cinching | Abrasion of the backing layer | Abrasion of the guide pole | Irregular winding | Frictional coefficient 0 run | Frictional coefficient 100 runs |
|---|---|---|---|---|---|---|---|
| 1 | +1.0 | No | No | No | No | 0.29 | 0.32 |
| 2 | +1.1 | No | No | No | No | 0.28 | 0.31 |
| 3 | +1.0 | No | No | No | No | 0.28 | 0.31 |
| 4 | +1.0 | No | No | No | No | 0.29 | 0.32 |
| 5 | +1.0 | No | No | No | No | 0.29 | 0.32 |
| 6 | +1.0 | No | No | No | No | 0.29 | 0.32 |
| 7 | +1.0 | No | No | No | No | 0.28 | 0.31 |
| 8 | +1.0 | No | No | No | No | 0.29 | 0.32 |
| 9 | +0.9 | No | No | Substantial | Slight | 0.29 | 0.50 |
| 10 | 0 | Slight | Slight | No | No | 0.29 | 0.45 |

TABLE 3

| | Y-S/N (dB) | Cinching | Abrasion of the backing layer | Abrasion of the guide pole | Irregular winding | Frictional coefficient 0 run | Frictional coefficient 100 runs |
|---|---|---|---|---|---|---|---|
| 1 | +1.3 | No | No | No | No | 0.29 | 0.31 |
| 2 | +1.4 | No | No | No | No | 0.28 | 0.30 |
| 3 | +1.3 | No | No | No | No | 0.28 | 0.30 |
| 4 | +1.3 | No | No | No | No | 0.29 | 0.31 |
| 5 | +1.3 | No | No | No | No | 0.29 | 0.31 |
| 6 | +1.3 | No | No | No | No | 0.29 | 0.31 |
| 7 | +1.3 | No | No | No | No | 0.28 | 0.30 |
| 8 | +1.3 | No | No | No | No | 0.29 | 0.30 |
| 9 | +1.2 | No | No | Substantial | Slight | 0.29 | 0.55 |
| 10 | 0 | Slight | Slight | No | No | 0.29 | 0.40 |

TABLE 4

| | Y-S/N (dB) | Cinching | Abrasion of the backing layer | Abrasion of the guide pole | Irregular winding | Frictional coefficient 0 run | Frictional coefficient 100 runs |
|---|---|---|---|---|---|---|---|
| 1 | +1.5 | No | No | No | No | 0.28 | 0.30 |
| 2 | +1.6 | No | No | No | No | 0.27 | 0.29 |
| 3 | +1.5 | No | No | No | No | 0.27 | 0.29 |
| 4 | +1.5 | No | No | No | No | 0.27 | 0.29 |
| 5 | +1.5 | No | No | No | No | 0.27 | 0.29 |
| 6 | +1.5 | No | No | No | No | 0.27 | 0.29 |
| 7 | +1.5 | No | No | No | No | 0.27 | 0.29 |
| 8 | +1.5 | No | No | No | No | 0.27 | 0.29 |
| 9 | +1.4 | No | No | Substantial | Slight | 0.27 | 0.53 |
| 10 | 0 | Slight | Slight | No | No | 0.27 | 0.39 |

With respect to each sample with the magnetic layer 1 or 2, the relation between the surface roughness of the backing layer and the surface roughness of the magnetic layer was investigated, whereby the results as shown in FIG. 1 were obtained. Therefore, in Tables 2 to 4, the surface roughness of the backing layer and the surface roughness of the magnetic layer were all selected to be at most 0.6 μm, and at most 0.08 μm, respectively. Further, the relation between the surface area of the metal powder and the S/N ratio was investigated with respect to the magnetic layers 1 and 2, and it was ascertained that the surface area is preferably at least 48 $m^2/g$. It is evident from Tables 2 to 4 that Comparative Sample 9 wherein only $TiO_2$ particles were used as the inorganic pigment, is likely to lead to irregular winding of the magnetic tape, although it is satisfactory with respect to other characteristics such as the color S/N, the cinching, the abrasion of the backing layer or the damage during the loading or unloading operation. In the case of Comparative Sample 10 in which small size $CaCO_3$ particles having an average particles size of 0.02 μm were used alone as the inorganic pigment, the magnetic tape had inferior characteristics with respect to the color S/N, the cinching and the abrasion of the backing layer, and the damage during the loading or unloading operation was substantial.

Whereas, Samples 1 to 8 representing Examples of the present invention are superior to Comparative Samples 9 and 10 in the color S/N and hardly susceptible to a cinching phenomenon. Further, no abrasion of the backing layer was observed, no substantial damage of the magnetic tape during the loading or unloading operation was observed, and no irregular winding of the magnetic tape resulted.

EXAMPLE 2

A backing layer was formed on the rear side of each of the above-mentioned polyester base films having the magnetic layers 1, 2 and 3, respectively, as follows.

| Formation of the backing layer | Parts by weight |
|---|---|
| Mohs hardness 5-7 (see Table 5) | x |
| Mohs hardness 2-4 (see Table 5) | y |
| Acryl-modified vinyl chloride-vinyl acetate-vinyl alcohol copolymer (prepared by the following method (a) and having a molecular weight: 30,000) | 40 |
| Acryl-modified polyurethane elastomer (the following method (b), molecular weight 20,000) | 40 |
| Polyfunctional acrylate (molecular weight: 1,000) | 20 |
| Stearic acid | 2 |
| Butyl stearate | 2 |
| Solvent mixture (MIBK/toluene) | 250 |

The radiation curable binders in the above mixture were prepared as follows:

(a) Synthesis of an Acryl-Modified Product of a Vinyl Chloride-Vinyl Acetate-Vinyl Alcohol Copolymer 750 Parts by weight of S-lec A, 1250 parts by weight of toluene, and 500 parts by weight of cyclohexanone were charged into a four-necked flask of a 5-liter capacity and dissolved under heating. After raising the temperature to 80° C., 6.14 parts by weight of 2-hydroxyethyl methacrylate adduct of tolylene diisocyanate was added. Further, 0.012 part by weight of tin octylate and 0.012 part by weight of hydroquinone were added, and the reaction was carried out at a temperature of 80° C. in a nitrogen ($N_2$) stream until the conversion of NCO reached 90%. After completion of the reaction, the reaction system was cooled and diluted by addition of 1250 parts by weight methyl ethyl ketone.

PRODUCTION OF 2-HYDROXYETHYL METHACRYLATE (2HEMA) ADDUCT OF TOLYLENE DIISOCYANATE (TDI)

348 Parts by weight of tolylene diisocyanate was heated to a temperature of 80° C. in a four-necked flask of one-liter capacity in a nitrogen ($N_2$) stream. Thereafter, 260 parts by weight of 2-hydroxyethyl methacrylate, 0.07 part by weight of tin octylate, and 0.05 part by weight of hydroquinone were added dropwise into a reaction vessel, while cooling to control the temperature inside the reaction vessel to be in a range of from 80° to 85° C. After completion of the dropwise addition, the mixture was stirred for three hours at 80° C. to complete the reaction. After completion of the reaction, the reaction product was taken out of the reaction vessel and cooled to obtain 2-hydroxyethyl methacrylate (2HEMA) adduct of tolylene diisocyanate (TDI) as a white paste.

(b) Synthesis of an Acryl-Modified Product of a Urethane Elastomer

250 Parts by weight of an isocyanate-terminated diphenylmethane diisocyanate (MDI) type urethane prepolymer, "Nippolan 4119", manufactured by Nippon Polyurethane Industry Co., 32.5 parts by weight of 2HEMA, 0.007 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the reaction vessel to be in a range of from 80° to 90° C. After completion of the dropwise addition, the reaction was conducted at 80° C. until the conversion of NCO reached at least 95%.

The above mixture for the backing layer was coated on the rear surface of the base film, on which a magnetic layer had already been formed, in such a manner that the thickness of the backing layer upon drying would be 1.0 μm. Then, the coated mixture was dried and subjected to surface smoothing treatment by calendering, and then irradiated with and cured by electron beams in a nitrogen ($N_2$) gas by means of an electron curtain type electron beam accelerator at an accelerating voltage of 150 KeV, at an electrode current of 10 mA, and at an absorption dose of 3 Mrad. The average particle size of the inorganic pigment $CaCO_3$ was 0.02 μm, and the average particle sizes of inorganic pigments in other samples were all within a range of from 0.04 to 0.5 μm.

Thereafter, the magnetic recording medium thus obtained was cut into a video-tape with a width of ½ inch, and set in a VHS video cassette, whereupon the electromagnetic conversion characteristics, the cinching phenomenon, the abrasion of the backing layer, the damage during the loading or unloading operation and the irregular winding, were measured. The results of the measurements are shown in Table 6 (the samples having the magnetic layer 1), Table 7 (the samples having the magnetic layer 2) and Table 8 (the samples having the magnetic layer 3). In Tables 5 to 8, Samples 11 to 18 represent Examples of the present invention, and Samples 19 and 20 are Comparative Examples. In the samples in Tables 6 and 7, each magnetic layer had a surface roughness of at most 0.08 μm, and each backing layer had a surface roughness of at most 0.6 μm.

TABLE 5

| Sample No. | Inorganic pigment Mohs hardness 5-7 | Inorganic pigment Mohs hardness 2-4 | Mixing ratio | Amounts of x and y (parts by weight) x | Amounts of x and y (parts by weight) y |
|---|---|---|---|---|---|
| 11 | $TiO_2$ | $CaCO_3$ | 8/2 | 100 | 100 |
| 12 | $\alpha\text{-}Fe_2O_3$ | $CaCO_3$ | 8/2 | 100 | 100 |
| 13 | $TiO_2$ | $CaCo_3$ | 8/2 | 100 | 100 |
| 19 | $TiO_2$ | — | — | 200 | — |
| 20 | — | $CaCO_3$ | — | — | 200 |
| 14 | MgO | $CaCO_3$ | 8/2 | 100 | 100 |
| 15 | $Fe_3O_4$ | | | | |
| 16 | $SiO_2$ | | | | |
| 17 | $SnO_2$ | | | | |
| 18 | $ZrO_2$ | | | | |

TABLE 6

| | Y-S/N (dB) | Cinching | Abrasion of the backing layer | Abrasion of the guide pole | Irregular winding | Frictional coefficient 0 run | Frictional coefficient 100 runs | Drop-out |
|---|---|---|---|---|---|---|---|---|
| 11 | +1.0 | No | No | No | No | 0.26 | 0.29 | 35 |
| 12 | +1.1 | No | No | No | No | 0.26 | 0.29 | 30 |
| 13 | +1.0 | No | No | No | No | 0.26 | 0.29 | 30 |
| 14 | +1.0 | No | No | No | No | 0.26 | 0.29 | 30 |
| 15 | +1.0 | No | No | No | No | 0.26 | 0.28 | 30 |
| 16 | +1.0 | No | No | No | No | 0.27 | 0.29 | 30 |
| 17 | +1.0 | No | No | No | No | 0.26 | 0.28 | 30 |
| 18 | +1.0 | No | No | No | No | 0.26 | 0.28 | 30 |
| 19 | +0.9 | No | No | Substantial | Slight | 0.27 | 0.50 | 200 |
| 20 | 0 | Slight | Slight | No | No | 0.27 | 0.45 | 300 |

TABLE 7

| | | Abrasion of the backing layer | Abrasion of the guide pole | Irregular winding | Frictional coefficient 0 run | Frictional coefficient 100 runs | Drop-out |
|---|---|---|---|---|---|---|---|
| Y-S/N (dB) | Cinching | | | | | | |
| 11 +1.3 | No | No | No | No | 0.26 | 0.28 | 30 |
| 12 +1.4 | No | No | No | No | 0.26 | 0.28 | 30 |
| 13 +1.3 | No | No | No | No | 0.25 | 0.27 | 30 |
| 14 +1.3 | No | No | No | No | 0.26 | 0.28 | 30 |
| 15 +1.3 | No | No | No | No | 0.26 | 0.28 | 30 |
| 16 +1.3 | No | No | No | No | 0.26 | 0.28 | 30 |
| 17 +1.3 | No | No | No | No | 0.26 | 0.28 | 30 |
| 18 +1.3 | No | No | No | No | 0.27 | 0.29 | 30 |
| 19 +1.2 | No | No | Substantial | Slight | 0.27 | 0.50 | 220 |
| 20 0 | Slight | Slight | No | No | 0.27 | 0.40 | 330 |

TABLE 8

| | | Abrasion of the backing layer | Abrasion of the guide pole | Irregular winding | Frictional coefficient 0 run | Frictional coefficient 100 runs | Drop-out |
|---|---|---|---|---|---|---|---|
| Y-S/N (dB) | Cinching | | | | | | |
| 11 +1.5 | No | No | No | No | 0.26 | 0.28 | 30 |
| 12 +1.6 | No | No | No | No | 0.25 | 0.27 | 30 |
| 13 +1.5 | No | No | No | No | 0.25 | 0.27 | 30 |
| 14 +1.5 | No | No | No | No | 0.25 | 0.27 | 30 |
| 15 +1.5 | No | No | No | No | 0.25 | 0.27 | 30 |
| 16 +1.5 | No | No | No | No | 0.25 | 0.27 | 30 |
| 17 +1.5 | No | No | No | No | 0.25 | 0.27 | 30 |
| 18 +1.5 | No | No | No | No | 0.25 | 0.40 | 35 |
| 19 +1.4 | No | No | Substantial | Slight | 0.27 | 0.50 | 210 |
| 20 0 | Slight | Slight | No | No | 0.27 | 0.39 | 310 |

With respect to each sample with the magnetic layer 1 or 2, the relation between the surface roughness of the backing layer and the surface roughness of the magnetic layer was investigated, whereby the results as shown in FIG. 1 were obtained. Therefore, in Tables 6 to 8, the surface roughness of the backing layer and the surface roughness of the magnetic layer were all selected to be at most 0.6 μm, and at most 0.08 μm, respectively. Further, the relation between the surface area of the metal powder and the S/N ratio was investigated with respect to the magnetic layers 1 and 2, and it was ascertained that the surface area is preferably at least 48 m²/g. It is evident from Tables 6 to 8 that Comparative Sample 19 wherein only TiO₂ particles were used as the inorganic pigment, is likely to lead to irregular winding of the magnetic tape, although it is satisfactory with respect to other characteristics such as the color S/N, the cinching, the abrasion of the backing layer or the damage during the loading or unloading operation. In the case of Comparative Sample 20 in which small size CaCO₃ particles having an average particles size of 0.02 μm were used alone as the inorganic pigment, the magnetic tape had inferior characteristics with respect to the color S/N, the cinching and the abrasion of the backing layer, and the damage during the loading or unloading operation was substantial.

Whereas, Samples 11 to 18 representing Examples of the present invention are superior to Comparative Samples 19 and 20 in the color S/N and hardly susceptible to a cinching phenomenon. Further, no abrasion of the backing layer was observed, no substantial damage of the magnetic tape during the loading or unloading operation was observed, and no irregular winding of the magnetic tape resulted.

As described in the foregoing, the present invention provides a magnetic recording medium comprising a base film, a magnetic layer formed on one side of the base film and a backing layer formed on the other side of the base film, characterized in that said backing layer is composed essentially of inorganic pigment particles having an average particle size of from 0.1 to 0.5 μm and a Mohs harndess of from 2 to 4 and inorganic pigment particles having an average particle size of from 0.1 to 0.5 μm and a Mohs hardness of from 5 to 7, dispersed in a binder, whereby it is possible to obtain a magnetic recording medium with a backing layer which has a high S/N ratio, and is capable of preventing the cinching phenomenon, the abrasion of the backing layer and the damage to the tape during the loading or unloading operation, and yet free from dislocation or irregular winding during a high speed winding operation.

What is claimed is:

1. A magnetic recording medium comprising a plastic base film, a magnetic layer formed on one side of the base film and a backing layer formed on the other side of the base film, characterized in that said magnetic layer has a surface roughness of at most 0.08 μm, and said backing layer having a surface roughness of from 0.05 to 0.6 μm and is composed essentially of first particles of an inorganic pigment having an average particle size of from 0.02 to 0.5 μm and a Mohs hardness of from 2 to 4 and second particles of an inorganic pigment having an average particle size of from 0.04 to 0.5 μm and a Mohs hardness of from 5 to 7 present in a weight ratio of 1:9 to 5:5, dispersed in a thermoset or radiation-cured binder the ratio of the total of said particles to said binder being 4:1 to 1:1.

2. The magnetic recording medium according to claim 1, wherein the magnetic layer has a coercive force of at least 1,000 Oe.

3. The magnetic recording medium according to claim 1, wherein the first particles are selected from the group consisting of $CaCO_3$, $ZnO$, $MgCO_3$ and $ZnCO_3$.

4. The magnetic recording medium according to claim 1, wherein the second particles are selected from the group consisting of $TiO_2$, $\alpha\text{-}Fe_2O_3$, $Fe_3O_4$, $MgO$, $SiO_2$, $SnO_2$ and $ZrO_2$.

5. The magnetic recording medium according to claim 2, wherein the second particles are selected from the group consisting of $TiO_2$, $\alpha\text{-}Fe_2O_3$, $Fe_3O_4$, $MgO$, $SiO_2$, $SnO_2$ and $ZrO_2$.

6. The magnetic recording medium according to claim 1, wherein the thermoset binder is made of a thermosetting resin composition comprising nitrocellulose, a polyurethane prepolymer, a vinyl chloride-vinyl acetate copolymer, a vinyl chloride-vinyl acetate-vinyl alcohol copolymer, a vinyl chloride-vinyl alcohol copolymer and a polyisocyanate.

7. The magnetic recording medium according to claim 1, wherein the thermoset binder is made of a thermosetting resin composition comprising a polyurethane prepolymer, a vinyl chloride-vinyl acetate copolymer and a polyisocyanate.

8. The magnetic recording medium according to claim 1, wherein the radiation-cured binder is made of a radiation curable resin having acrylic, maleic or allyl-type double bonds.

9. The magnetic recording medium according to claim 1, wherein the magnetic layer is composed essentially of ferromagnetic alloy powder dispersed in a resin binder.

10. The magnetic recording medium according to claim 1, wherein the magnetic layer is a thin ferromagnetic metal layer.

Notice of Adverse Decision in Interference

In Interference No. 101,953, involving Patent No. 4,639,389, M. Nishimatsu, T. Ide and H. Arioka, MAGNETIC RECORDING MEDIUM, final judgment adverse to the patentees was rendered Dec. 2, 1988, as to claims 1 - 10.
[*Official Gazette February 14, 1989.*]